Patented Dec. 2, 1941

2,264,812

UNITED STATES PATENT OFFICE 2,264,812

CHEMICAL PROCESS FOR SPLITTING OF ETHYLIDENE DIACETATE

Ferdinand Schulze, Waynesboro, Va., assignor to E. I. du Pont de Nemours & Company, Wilmington, Del., a corporation of Delaware No Drawing. Application March 4, 1939,
Serial No. 259,795

11 Claims. (Cl. 260—549)

This invention relates to the splitting of ethylidene diacetate to form acetaldehyde and acetic anhydride.

The method described in U. S. Patent No. 1,579,248 of splitting ethylidene diacetate in the presence of zinc halide as a catalyst to form acetic anhydride and acetaldehyde, while conducive to high yields of the desired products, leads to the formation of considerable quantities of valueless tarry by-products. These constitute a corresponding waste of the ethylidene diacetate, and their removal leads to waste of catalyst.

It has been discovered that it is possible to greatly reduce the amount of tar formation and to effect a very substantial saving in starting material and catalyst by adding to the ethylidene diacetate in a splitting vessel certain compounds which in themselves have negligible splitting activity but which serve to modify, modulate, the tar-forming action of the regular catalyst.

It is, therefore, an object of this invention to provide an improved process for splitting ethylidene diacetate.

Another object is to provide a process for splitting ethylidene diacetate that is saving of the catalyst and the diacetate.

A still further object of the invention is to reduce the formation of tarry by-products in the ethylidene diacetate splitting still without inhibiting the rate of splitting.

Other objects will be apparent from the description which follows.

The objects of this invention are accomplished by adding to the ethylidene diacetate and the zinc halide catalyst in a splitting vessel, a stable metal derivative of an organic compound that is soluble in the reaction mass. Such a modifier will not substantially inhibit the rate of the splitting reaction. The said metal derivative may be added as such, or the ingredients, which are necessary to form said derivative in situ in the reaction mass, may be added. Throughout the specification and claims any reference to the addition of a metal organic derivative to the ethylidene diacetate and zinc halide catalyst shall be considered as including the addition of such ingredients as are necessary to form said derivative in situ in the reaction mass. Of the metal derivatives that may be used, the zinc derivatives of organic compounds are by far the most effective and, therefore, constitute the preferred class of materials. Of the various known zinc-organic compounds, zinc acetamide has been found to be outstanding. However, other metal derivatives of organic compounds may be used to good advantage. For example, the cadmium, mercury, copper, tin, lead, aluminum, arsenic, bismuth, iron, chromium and antimony derivatives of organic compounds will be operative and may be used to good advantage. The metal derivatives are generally best prepared in situ from the equivalent amount of metal oxide or acetate or other non-alkali forming metal compound containing a weak negative radical although, if desired, the metal derivative can be added to the still along with the other materials.

The metal derivatives of an organic compound should be derivatives which are not subject to decomposition by the high temperature and severe dehydrating and acetylating conditions prevalent in the splitting vessel. The derivative must, of course, be soluble at least to a slight extent to be effective as a tar-formation inhibiting modifier. In order to obtain the best results, the modifier should be soluble to the extent that one mol thereof will be dissolved per mol of zinc halide catalyst used.

Organic compounds containing an acidic hydrogen atom bound directly to carbon or nitrogen which will react with a metal compound to form metal derivatives that are soluble in the reaction mass and not volatile or subject to decomposition in the reaction mass are especially useful for the formation of the metal derivative of an organic compound. Such organic compounds having an acidic hydrogen atom in which the metal replaces said acidic hydrogen atom may be selected from the following classes of organic compounds:

1. Primary or secondary amides or ammonium salts in which the acidic radicals may be of either aryl, aralkyl, simple alkyl, or naphthenic derivation.

2. Mono-acylated or arylated primary amines.

3. High-boiling secondary amines containing substituent groups of such negativity as to prevent acetylation of the free amino hydrogen in the reaction mass.

4. Compounds which contain acidic methylene or methine groups.

5. Substituted phenols, particularly those in which the positions ortho and para to the hydroxyl group are substituted with electropositive groups, such as the nitro group.

As specific organic compounds which may be used in accordance with the present invention for the formation of cadmium, mercury, copper, tin, lead, aluminum, arsenic bismuth, iron, chromium and antimony metal derivatives, the following may be mentioned: Phthalimide, triphenylmethane, acetamide, urea, diphenyl methane, fluorene, acetanilide and dixylenol methane have proved satisfactory from the standpoint of stability and solubility, are effective in reducing tar formation, and do not substantially retard the rate of splitting. Other compounds which may form suitable metal derivatives and which may be used in accordance with this invention are thiourea and substituted thioureas, cyanamide and its polymers, dicyandiamide and melamin, guanidine and substituted guanidines, cyanuric acid, hydrazobenzene, asdiphenyl hydrazine, aryl sulfonamides, alkyl sulfonamides, picric acid and other high-boiling phenols, uric acid and other purines, barbituric acid, thiophenols and mercaptans. It is to be understood, of course, that such metallic organic compounds have the required stability, solubility and freedom from any substantial inhibition in the rate of splitting of the ethylidene diacetate set forth earlier in this application.

The following examples will serve to illustrate the application of the invention. In all cases in the following examples, the reaction is carried out in a flask bearing three necks. One of the necks is equipped with an efficient fractionating column. The remaining two necks are fitted with feeding and purging devices, respectively.

Example I

The flask is charged with 500 grams of purified ethylidene diacetate, 3.8 grams of zinc acetate, and 9.4 grams of phthalimide. The temperature of the ingredients is raised to 150° C., whereupon 3.6 grams of zinc bromide are added. At this stage it is observed that all the substances are in solution. Aldehyde and anhydride are taken off at the top of the column and fresh ethylidene diacetate is added at a rate sufficient to maintain the original level in the splitting flask. The anhydride and aldehyde are separated by fractional distillation. In order to maintain continuously the formation of anhydride and aldehyde, it is necessary to purge from 2 to 10% of the contents of the splitting vessel at intervals of one hour or more, and to add ethylidene diacetate, catalyst and modifier to replace that which has been removed by purging.

In the absence of the modifier the purge rate is about three times as great as when the above conditions are observed; hence, about three times as much catalyst is required for the same production of anhydride and aldehyde. In either case the principal loss in yield is the formation of tarry material, the extent of this loss being measured by the purge rate required for satisfactory splitting.

Example II

The same conditions outlined in Example I are maintained, except that triphenylmethane (15.6 grams) replaces the phthalimide. The yield of anhydride and aldehyde is practically the same as when the zinc derivative of phthalimide is used as the modifier.

Example III

The flask is charged with 500 grams of technical ethylidene diacetate, 1.0 gram of zinc oxide, and 2.6 grams of acetamide. When the temperature of these substances has been raised to approximately 150° C., 2.4 grams of zinc bromide (or 1.5 grams zinc chloride) are added. The production of anhydride and aldehyde is effected in the manner described in Example I. The rate of splitting is somewhat lower than Example I. A somewhat lower purge rate may be maintained due to the lower concentration of the splitting catalyst; hence the yield of desired products is somewhat higher in terms of catalyst consumed.

Example IV

Splitting is conducted in a manner entirely similar to that described in Example III, except that urea (1.2 grams) is substituted for the acetamide. The results are identical with those obtained in Example III.

Although the modifiers included in this invention do not seriously affect the activity of the catalyst insofar as splitting is concerned, they do largely prevent the undesired formation of tar. This behavior is believed to be in line with the observation that the presence of a modifier in the splitting mixture prevents a major portion of the loss of volatile halogen derivative which may be observed in its absence. It is reasonable to suppose that the formation of tar may be caused by these volatile halogen derivatives, and that the presence of excess zinc in a soluble but neutral form either exerts a mass-action effect in repressing the formation of the volatile halogen compound (by some phenomenon related to hydrolysis) or else acts as a buffer in neutralizing the acidic halogen derivative immediately after its formation. Whatever may be the phenomena, the net result is that the neutral zinc or other metal derivative prevents the undesirable side reaction without seriously decreasing the rate of formation of anhydride and aldehyde, so that with the use of a modifier it is possible to decrease several-fold the amount of tar produced and to greatly decrease the amount of catalyst required in splitting the same amount of ethylidene diacetate.

As above pointed out zinc acetamide has been found to be outstanding as a tar-formation inhibitor. Whether the zinc acetamide is formed in situ or whether the same is added as such, it appears that the zinc acetamide forming ingredients or the zinc acetamide itself is converted to diacetimide or the zinc derivative of diacetimide. It is possible that zinc acetamide is outstanding by reason of this formation of diacetimide. This, however, is merely theoretical.

Throughout the discussion of this invention the splitting catalyst specifically employed has been zinc bromide or a complex salt containing zinc bromide. It is to be understood that other zinc halides, for instance, zinc chloride and zinc iodide, may be used to good advantage.

As the result of this invention, the splitting of ethylidene diacetate may be carried out much more efficiently with the purge rate reduced to one-third, or even less, than used theretofore, and with substantially proportional savings of the catalyst, and very substantial reductions in the loss of acetic acid values. Another advantage of this invention is that the use of these modifiers permits the use of a higher concentration of splitting catalyst than has hitherto been considered advisable, since in the presence of the modifier the formation of tar is but little more than proportional to the concentration of the splitting catalyst.

Obviously, many modifications and changes may be made in the above described details without departing from the nature and spirit of the invention, and it is to be understood that it is not to be limited to the specific description except as set forth in the appended claims.

I claim:

1. The process of splitting ethylidene diacetate to form acetaldehyde and acetic anhydride which comprises splitting the ethylidene diacetate by heating in a liquid reaction mass containing a zinc halide catalyst and a tar-formation inhibiting modifier, said modifier consisting of the reaction product of a non-alkali forming metal compound containing a weak negative radical and an organic compound having an acidic hydrogen atom in which the metal replaces said acidic hydrogen atom.

2. In the splitting of ethylidene diacetate by heating in the presence of a zinc halide catalyst to form acetaldehyde and acetic anhydride, the addition to the liquid reaction mass of an organic compound having an acidic hydrogen atom replaceable by a metal and a non-alkali forming metal compound containing a weak negative radical which metal compound will react with said organic compound to form in said liquid reaction mass a metal derivative of said organic compound.

3. The process of splitting ethylidene diacetate to form acetaldehyde and acetic anhydride which comprises splitting the ethylidene diacetate by heating in a liquid reaction mass containing a zinc halide catalyst and a tar-formation inhibiting modifier, said modifier consisting of zinc mono-acetamide.

4. The process of splitting ethylidene diacetate to form acetaldehyde and acetic anhydride which comprises splitting the ethylidene diacetate by heating in a liquid reaction mass containing a zinc halide catalyst and a tar-formation inhibiting modifier, said modifier consisting of a zinc acetamide.

5. The process of splitting ethylidene diacetate to form acetaldehyde and acetic anhydride which comprises splitting the ethylidene diacetate by heating in a liquid reaction mass containing a zinc halide catalyst and a tar-formation inhibiting modifier, said modifier consisting of zinc diacetimide.

6. The process of splitting ethylidene diacetate by heating to form acetaldehyde and acetic anhydride which comprises adding to the liquid reaction mass of ethylidene diacetate, a zinc halide catalyst, zinc acetate and acetamide.

7. The process of splitting ethylidene diacetate by heating to form acetaldehyde and acetic anhydride which comprises adding to the liquid reaction mass of ethylidene diacetate, a zinc halide catalyst, zinc oxide and acetamide.

8. In the splitting of ethylidene diacetate by heating in the presence of a zinc halide catalyst to form acetaldehyde and acetic anhydride, the addition to the liquid reaction mass of acetamide and a non-alkali forming metal compound containing a weak negative radical which metal compound will react with said acetamide to form in said liquid reaction mass a metal derivative of said acetamide.

9. The process of splitting ethylidene diacetate to form acetaldehyde and acetic anhydride which comprises splitting the ethylidene diacetate by heating in a liquid reaction mass containing a zinc halide catalyst and a tar-formation inhibiting modifier, said modifier consisting of the reaction product of acetamide and a non-alkali forming metal compound containing a weak negative radical.

10. The process of splitting ethylidene diacetate by heating to form acetaldehyde and acetic anhydride which comprises splitting the ethylidene diacetate in a liquid reaction mass containing a zinc halide catalyst and a tar-formation inhibiting modifier, said modifier consisting of a zinc derivative of an organic compound having an acidic hydrogen atom in which the zinc replaces said acidic hydrogen atom.

11. In the splitting of ethylidene diacetate by heating in the precence of a zinc halide catalyst to form acetaldehyde and acetic anhydride, the addition to the liquid reaction mass of an organic compound having an acidic hydrogen atom replaceable by zinc, and a zinc compound which will react with said organic compound to form in said liquid reaction mass a zinc derivative of said organic compound.

FERDINAND SCHULZE.